United States Patent
Bonnici et al.

(10) Patent No.: US 10,218,240 B2
(45) Date of Patent: Feb. 26, 2019

(54) FITTING OF STATOR BODY IN BEARING OF ROTARY ELECTRICAL MACHINE, AND ROTARY ELECTRICAL MACHINE COMPRISING THE FITTING

(71) Applicant: VALEO EQUIPEMENTS ELECTRIQUES MOTEUR, Créteil (FR)

(72) Inventors: Matthieu Bonnici, Maisons-Alfort (FR); Frederic Palleschi, Thiais (FR); Delphine Pentecote, Creteil (FR)

(73) Assignee: Valeo Equipements Electriques Moteur, Creteil (FR)

( * ) Notice: Subject to any disclaimer, the term of this patent is extended or adjusted under 35 U.S.C. 154(b) by 687 days.

(21) Appl. No.: 14/648,630

(22) PCT Filed: Dec. 4, 2013

(86) PCT No.: PCT/FR2013/052935
§ 371 (c)(1),
(2) Date: Jul. 23, 2015

(87) PCT Pub. No.: WO2014/087098
PCT Pub. Date: Jun. 12, 2014

(65) Prior Publication Data
US 2015/0318755 A1    Nov. 5, 2015

(30) Foreign Application Priority Data

Dec. 7, 2012 (FR) ...................................... 12 61752

(51) Int. Cl.
| H02K 5/16 | (2006.01) |
| H05B 6/10 | (2006.01) |
| H02K 15/06 | (2006.01) |
| H05B 6/04 | (2006.01) |
| H02K 3/28 | (2006.01) |
| B23P 11/02 | (2006.01) |
| H02K 5/15 | (2006.01) |
| H02K 9/22 | (2006.01) |

(Continued)

(52) U.S. Cl.
CPC ............ *H02K 5/161* (2013.01); *B23P 11/025* (2013.01); *H02K 3/28* (2013.01); *H02K 5/15* (2013.01);
(Continued)

(58) Field of Classification Search
CPC . B23P 11/025; H02K 15/062; H02K 2213/03; H02K 3/28; H02K 5/15;
(Continued)

(56) References Cited

U.S. PATENT DOCUMENTS 2,928,963 A    3/1960   Bertsche et al.
5,075,585 A   12/1991  Teruyama et al.
(Continued)

FOREIGN PATENT DOCUMENTS

EP    1833139    9/2007
EP    2113663   11/2009
(Continued)

OTHER PUBLICATIONS

Translation of foreign document JP 2001319765 A (Year:2001).*

*Primary Examiner* — Alex W Mok
(74) *Attorney, Agent, or Firm* — Berenato & White, LLC

(57) ABSTRACT

The fitting of a stator (13) body (14) equipped with a winding (12) in an inner support surface (250) for a skirt (155) of a bearing (15) of a rotary electrical machine, such as an alternator or an alternator-starter of a motor vehicle, characterized in that the skirt (155) is heated locally by induction before fitting of the body (14) equipped with its winding (12) in the skirt (155). The invention also relates to a rotary electrical machine comprising a fitting of this type.

18 Claims, 5 Drawing Sheets

(51) Int. Cl.
*H02K 15/02* (2006.01)
*H02K 15/12* (2006.01)

(52) U.S. Cl.
CPC ............. *H02K 9/22* (2013.01); *H02K 15/028* (2013.01); *H02K 15/062* (2013.01); *H02K 15/12* (2013.01); *H05B 6/04* (2013.01); *H05B 6/101* (2013.01); *H02K 2213/03* (2013.01); *Y10T 29/49011* (2015.01)

(58) Field of Classification Search
CPC ...... H02K 5/161; H02K 15/00; H02K 15/028; H02K 15/12; H02K 9/22; H05B 6/04; H05B 6/101; Y10T 29/49011
USPC ...................................... 310/90, 195; 29/596
See application file for complete search history.

(56) References Cited

U.S. PATENT DOCUMENTS

| | | | | |
|---|---|---|---|---|
| 6,501,205 | B1* | 12/2002 | Asao | H02K 3/12 310/184 |
| 7,073,247 | B2* | 7/2006 | Rowe | B23K 1/0008 228/180.5 |
| 2001/0024071 | A1* | 9/2001 | Yoshida | H02K 5/15 310/201 |
| 2009/0152969 | A1* | 6/2009 | Narita | F16C 17/10 310/90 |
| 2010/0295412 | A1* | 11/2010 | Matsumoto | H02K 15/12 310/273 |
| 2010/0320194 | A1* | 12/2010 | Koide | H02K 15/12 219/635 |
| 2011/0278995 | A1* | 11/2011 | Akutsu | B62D 5/0403 310/68 D |
| 2011/0302769 | A1* | 12/2011 | Saito | H02K 15/024 29/596 |

FOREIGN PATENT DOCUMENTS

| | | |
|---|---|---|
| FR | 2745445 | 8/1997 |
| FR | 2820896 | 8/2002 |
| FR | 2857517 | 1/2005 |
| FR | 2886477 | 12/2006 |
| FR | 2918815 | 1/2009 |
| GB | 1300215 | 12/1972 |
| JP | 2001319765 | 11/2001 |
| WO | WO02054566 | 7/2002 |

* cited by examiner

FITTING OF STATOR BODY IN BEARING OF ROTARY ELECTRICAL MACHINE, AND ROTARY ELECTRICAL MACHINE COMPRISING THE FITTING

CROSS-REFERENCE TO RELATED APPLICATIONS AND CLAIM TO PRIORITY

This application is a national stage application of International Application No. PCT/FR2013/052935 filed Dec. 4, 2013, which claims priority to French Patent Application No. 1261752 filed Dec. 7, 2012, of which the disclosure is incorporated herein by reference and to which priority is claimed.

FIELD OF THE INVENTION

The present invention relates to fitting of a stator body in a cylindrical inner support surface for receipt of a skirt of a flange, known as a bearing, of a rotary electrical machine, such as an alternator and/or alternator-starter of a motor vehicle.

The present invention also relates to a rotary electrical machine of this type equipped with fitting of this type.

PRIOR ART

A stator, a bearing and a rotary electrical machine of this type are disclosed by way of example in FIG. 1, which is a half-view in axial cross-section of a polyphase alternator with internal ventilation, of a motor vehicle with a thermal engine identical to that of document FR 2 918 815, to which reference will be made for further details.

This alternator comprises a housing bearing a stator 13 which surrounds a rotor 4 integral with a shaft 2 which is fitted such as to rotate in the housing, which comprises at least one front flange, known as the front bearing 15, and a rear flange, known as the rear bearing 16.

These bearings 15, 16 are made of metal. They are for example made of aluminium, and each support centrally, by means of a receptacle, a bearing means such as a ball bearing 17 and 18, for rotary fitting of the shaft 2 of the rotor 4, the axis of which constitutes the axis of rotation and axial symmetry of the alternator.

The bearings 15, 16 can be assembled to one another for example by means of tie rods or screws, with the appearance of play between the bearings. The housing also comprises at least one lug for securing the housing on a fixed part of the vehicle. Thus, the housing is connected electrically to the earth of the vehicle by means of a securing lug/securing lugs, and makes it possible to discharge heat by conduction. The number of tie rods or assembly screws and the number of lugs for securing of the bearings 15, 16 depends on the applications.

The rotor 4 has an annular form, and comprises at least one excitation winding 5. This rotor 4 (FIG. 1) can consist of a rotor with claws, and comprise two magnet wheels 6, 7 with claws, which in this case are made of ferromagnetic steel, and an excitation winding 5 fitted between the wheels 6, 7.

The shaft 2 can be assembled with the magnet wheels 6, 7 by being forced together by means of portions which are knurled for this purpose.

The stator 13 comprises a metal body 14 with an annular form, which in this case is in the form of a set of plates, in order to reduce the Foucault currents, each having a plurality of notches which correspond to one another. This body 14 bears a polyphase stator winding 12, which passes through the body 14 by means of its notches, and extends projecting on both sides of the body 14, in order to form a first winding end and a second winding end which are known as chignons.

The winding 12 can comprise conductive segments which are connected to one another for example by welding. As a variant, the winding can comprise continuous wires. These conductors can have a cross-section which is rectangular, square, polygonal or round. The cross-section of the notches depends on that of the conductors, which have a core made of electrically conductive material, generally copper, or as a variant aluminium, covered by at least one electrically insulating layer, such as enamel. An electrical insulator is provided for each notch, in order to insulate the winding 12 electrically, in order not to damage the insulating layer of the winding 12 during the fitting of the winding in the notches in the body 14. This winding 12 comprises a plurality of turns, the number of which depends on the number of phases of the polyphase alternator. Each phase of the stator comprises at least one turn.

The ends of the winding 5 are connected by wired connections to collector rings which are integral with the rear end of the shaft 2, and belong to a collector 3. Brushes (with no reference) can rub on the rings. These brushes are supported by a brush-holder 10, which is integral with a voltage regulator.

The front end of the shaft 2 can support a drive unit 1, such as a pulley, which belongs to a movement drive, such as a belt drive, between the shaft 2 and the crankshaft of the thermal engine of the vehicle, which is why the roller 17 of the bearing 15 has a larger diameter than the roller 18 of the bearing 16. As a variant the drive is by means of chains or gears.

The ends of the turns of the winding 12 are connected to a device 11 for rectification of the current from alternating to direct. A protective cover (with no reference) can cover the rectification device 11 whilst being integral with the bearing 16, for example by screwing or snapping in. As a variant, the protective cover can be integral with the rear bearing 16.

In this case, the cover and the bearings 15, 16 are perforated for circulation of a cooling fluid, such as air, inside the housing of the machine. In FIG. 1, arrows represent the path of the cooling fluid, in this case air, into the interior of the alternator and through the various air intake and outlet openings in the bearings 15, 16.

The bearings 15, 16 can have a hollow form, and each comprise a base, with orientation which is globally transverse relative to the axis of the shaft 2. This base has centrally a receptacle for the ball bearing 17, 18, and is extended on its outer periphery by a rim with orientation which is globally axial relative to the axis of the shaft 2. This rim constitutes a skirt. The bases of the bearings 15, 16 each comprise air intake openings, one of which can be seen in FIG. 1. These openings have a form which is generally globally trapezoidal. The rims in the form of a skirt of the bearings 15, 16 have air outlet openings, one of which is shown in FIG. 1. These openings have an oblong form axially and also affect the outer periphery of the base of the bearing concerned for reasons of withdrawing from the mould.

Air can be circulated by means of at least one fan, such as a fan of the centrifugal type which is integral with the rotor. This fan comprises projecting blades which are integral with a flange secured on the rotor, for example by spot welding.

The rotor 4 can support at each of its axial ends respectively a front fan 8 and a rear fan 9, which is more powerful since it must cool the current rectification device 11, as well as the voltage regulator. As a variant, this rear fan 9 comprises two fans which are superimposed in order to increase the number of blades.

Thus, when the excitation winding 5 of the rotor 4 is supplied electrically, and the shaft of the rotor is rotating, the rotor is magnetised with formation of north and south poles, and an induced alternating current is generated in the winding 12 of the stator 13.

This induced current is rectified into a direct current by the rectification device 11, in particular in order to charge the battery of the vehicle and/or supply the consumers of the on-board network of the vehicle.

The rotary electrical machine is heated in particular by Joule effect, in the knowledge that the resistance of the winding 5 and of the winding 12, 13 increases according to the temperature. The circulation of the air generated by the rotation of the fan(s) makes it possible in particular to cool the chignons of the winding 12, the current rectification device 11, the bearings 17, 18, the winding 5, and the voltage regulator.

The current rectification device 11 can be supported by the base of the rear bearing 16, and comprise diodes which are fitted head to tail, the number of which depends on the number of turns of the winding 12.

This device 11 can consist of a rectifier bridge which comprises:

a plurality of positive diodes supported by a positive metal support which is designed to be connected to the positive terminal of the battery;

a plurality of negative diodes supported by the base of the rear bearing which is connected to the earth of the vehicle;

a connector in order to connect the tails of the diodes to the outputs of the phases of the stator, and insulate the positive support against the rear bearing.

The connector can comprise a body made of plastic material in which there are embedded tracks of the connections to the diodes, for formation of the arms of the bridge.

As can be seen in FIG. 2, which is a view in perspective of the rotor 4 identical to FIG. 2 of the aforementioned document FR 2 918 815, the magnet wheels 6, 7 each have a flange 22 with transverse orientation which bears claws on its outer periphery. Each claw comprises on its inner periphery a transverse part 20 for rooting on the flange 22, and on its outer periphery it has teeth 19 with axial orientation and a trapezoidal form. The teeth 19 of one wheel 6, 7 face towards the flange of the other wheel 7, 6. Circumferential offsetting is provided between the teeth of the wheel, which are imbricated. Chamfered parts 21 connect each tooth 19 to its rooting part 20.

On their interior, the flanges 22 each have an annular excess thickness 23. These two excess thicknesses form a core for fitting of the excitation winding 5 which is implanted between the flanges 22. As a variant, the core is in a single piece, and is distinct from the flanges of the wheels 6, 7.

Permanent magnets 38 can be interposed between at least some teeth 19, in order to increase the power of the alternator, as can be seen in FIG. 2.

When the rotor is magnetised, in a known manner, each tooth defines a magnetic north or south pole.

The number of notches in the body 14 of the stator 13 depends on the number of teeth 19 and on the number of turns of the winding 12.

Thus, in the case of a three-phase alternator with 12 poles, each wheel 6, 7 comprises six teeth 19 and the body 14 of the stator comprises 36 notches. In the case of a hexaphase alternator, each magnet wheel comprises six teeth and the stator body comprises 72 notches. For a rotor with 12 poles and an alternator of the pentaphase type, the number of notches will be 60. For a rotor with 14 poles, the body of the three-phase stator will comprise 42 notches. The rotor can comprise 16 poles, as in FIG. 2. The number of notches in the body 14 thus depends on the applications.

A small air gap exists between the inner periphery of the body 14 of the stator 13 and the outer periphery of the rotor 4 constituted by the outer periphery of the teeth 19. In this figure, the length L1 of the body 14 is smaller than the axial distance L2 between the two ends of two adjacent teeth each belonging to a wheel 6, 7. These ends are delimited by the chamfered parts 21.

In this document FR 2 918 815, the axial ends of the body 14 of the stator are each fitted axially in a cylindrical inner support surface for receipt of one of the rims of the bearings 15, 16, in order to discharge by conduction the calories derived from the body 14 of the stator 13 heated by the winding 12. This discharge of heat is also not as good as desired.

It can be desirable to improve further the discharge of the calories.

Objective of the Invention

The objective of the present invention is to fulfil this requirement.

The object of the invention is thus to discharge the calories of the stator in an optimum manner by means of the housing of the rotary electrical machine.

According to the invention, fitting of a stator body in a cylindrical inner support surface for receipt of a skirt of a bearing of a rotary electrical machine, such as an alternator or an alternator-starter of a motor vehicle, is characterised in that the skirt is heated locally by induction before fitting of the body equipped with its winding in the skirt.

By means of the invention, local heating is obtained which is rapid, efficient, energetic, reproducible and compact. This localised heating is without contact with the source of energy, and provides safety for the operators, whilst being economical, energetic, and easy to integrate in production lines. This heating by induction is by definition of the electromagnetic type. This also spares the ball bearing for support of the rotor shaft as well as the base of the bearing, and in particular the receptacle for fitting of the ball bearing which is associated with the rotor shaft. In addition, on its exterior, the skirt of the bearing can have a cylindrical or frusto-conical form.

According to the invention, a rotary electrical machine is characterised in that it comprises a bearing provided with a cylindrical inner support surface for receipt of the stator body, with fitting of the stator body according to the invention.

Thus, the inner support surface is expanded locally by induction for receipt of a stator body.

According to other characteristics which provide other advantages, and are taken in isolation or in combination:

The heating by induction is carried out by a solenoid which has at least one turn, and surrounds the skirt locally and without contact, such that the skirt is immersed in an electromagnetic field.

The inner support surface of the skirt is heated locally by induction, thus making it possible to spare further the ball bearings which support the shaft of the rotor.

After heating by induction, the clamping between the inner support surface and the outer periphery of the stator body is equal to or more than −0.1 mm, such that this provides a thermal gain at the level of the stator body equipped with a winding.

The inner support surface of the skirt is provided by removing material at the level of the free end of the skirt, with formation of an axial stop shoulder for the stator body.

The inner support surface is formed at the level of the free end of the skirt.

The axial length of the inner support surface is more than half the axial length of the stator body, in order to discharge the heat better at the level of the hottest area of the stator body.

The bearing for fitting of the stator body is associated with another bearing with a skirt provided with a second, inner support surface for guiding of the stator body with the presence of axial play between the free ends opposite one another of the two bearings.

The axial length of the second fitting support surface is equal to at least 10% of the axial length of the stator body.

The length of the stator body is between 26 and 42 mm.

The stator body is equipped with a winding which on both sides of the stator body has chignons with a pointed form and a length of between 15 and 20 mm.

The bearing comprises a skirt which has tracks for heating by induction.

The invention will be better understood, and other advantages will become apparent in the light of the following description which is provided purely by way of indication, and is not intended to limit the invention, together with the accompanying drawings.

DESCRIPTION OF EMBODIMENTS OF THE INVENTION

Figure 1:
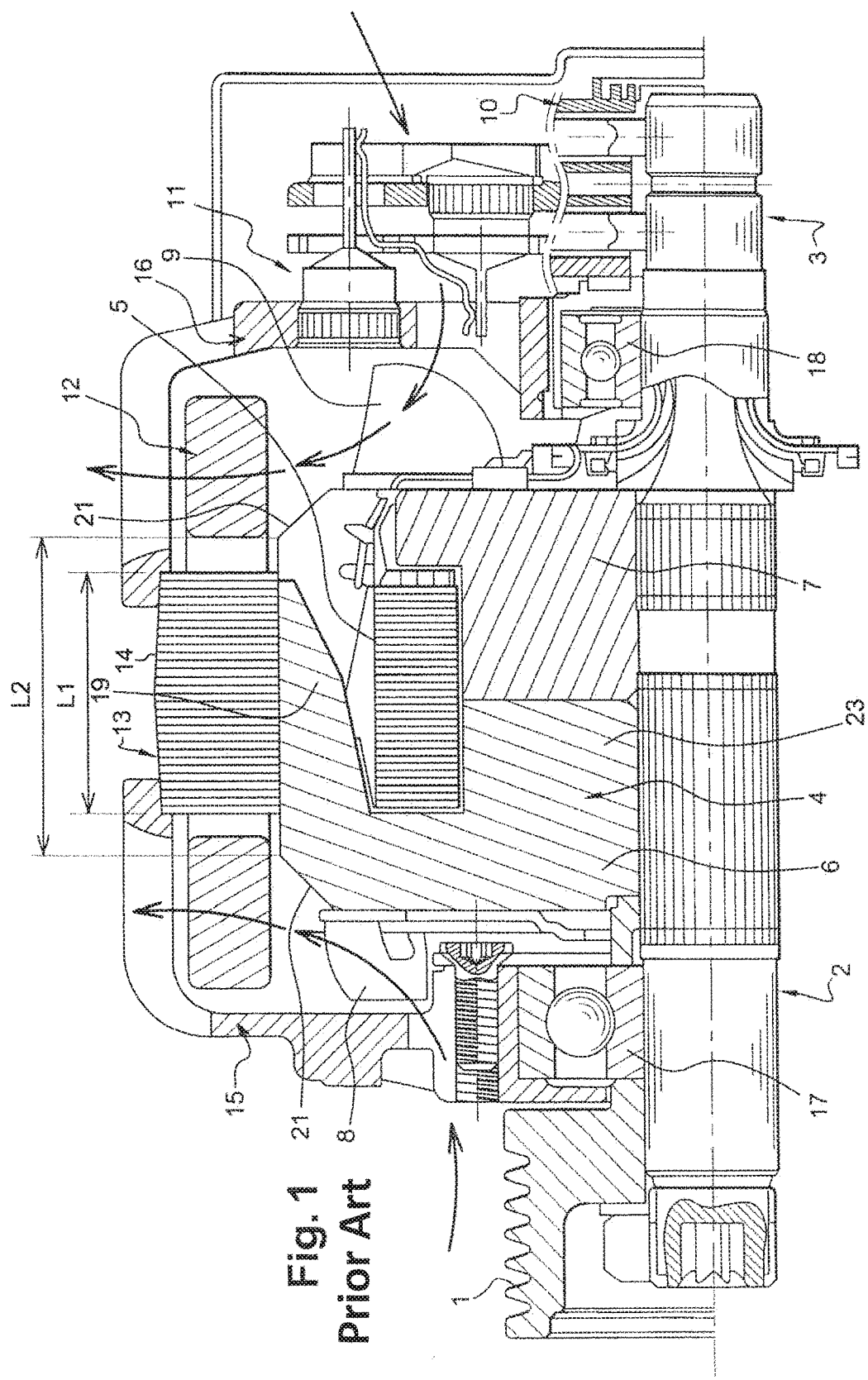
FIG. 1 is a half view in axial cross-section of a rotary electrical machine according to the prior art in the form of a polyphase alternator with internal ventilation.
Figure 2:
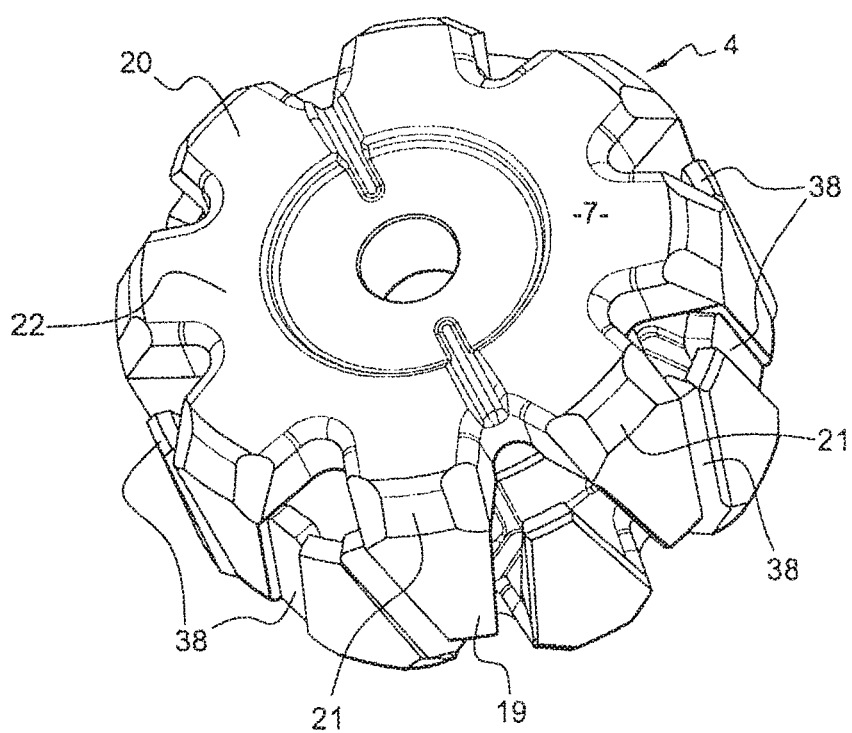
FIG. 2 is a view in perspective of the rotor in FIG. 1, which can be equipped with permanent magnets.
Figure 3:
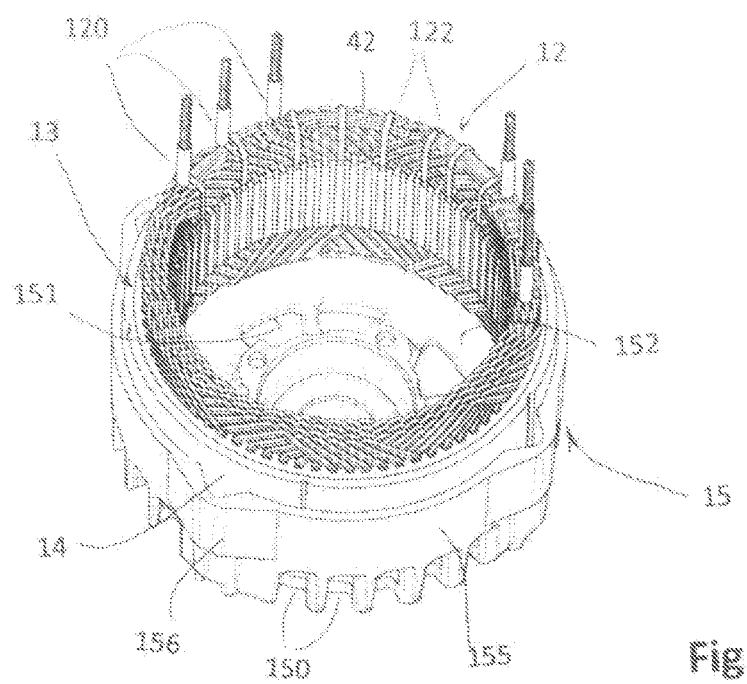
FIG. 3 is a view in perspective of the stator fitted by winding in the front bearing of the rotary electrical machine.
Figure 4:
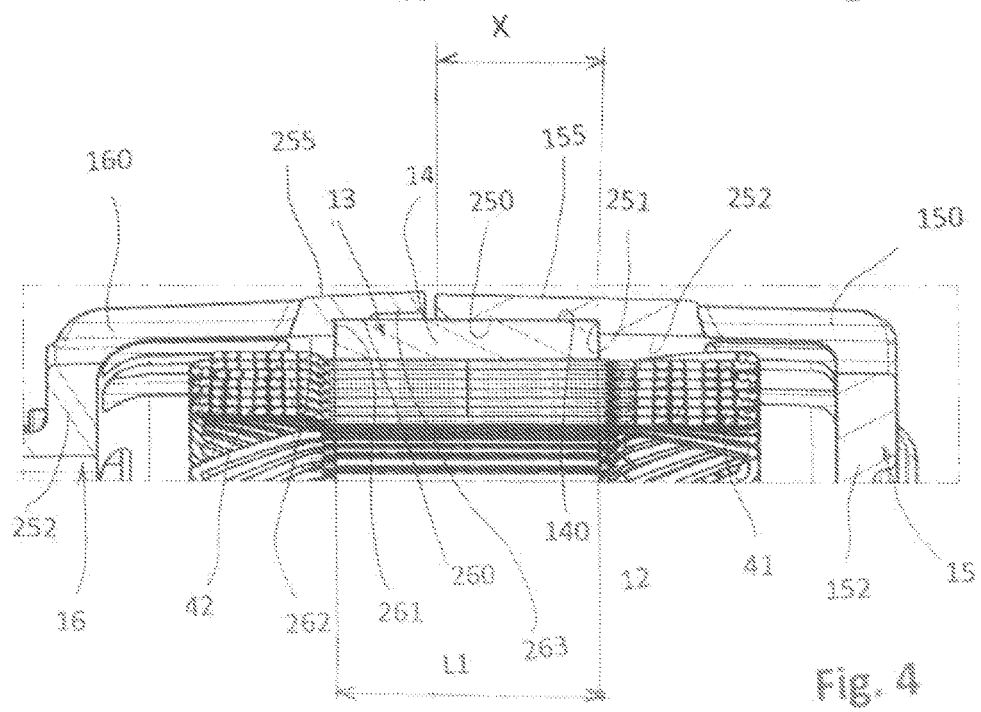
FIG. 4 is a partial view in axial cross-section of the electrical machine equipped with the stator fitted by winding in the front bearing of the rotary electrical machine.

In the embodiment in FIGS. 3 and 4, the same references will be used for elements which are identical or similar to those in FIGS. 1 and 2. The orientations axial, transverse and radial will apply with reference to the axis of the shaft 2 in FIG. 1. In these FIGS. 3 and 4, the body 14 of the stator 13 is equipped with a winding 12, and is fitted by winding by induction in a cylindrical inner support surface 250 for receipt of a skirt 155 of a flange 15, known as a bearing, of a rotary electrical machine, such as an alternator or an alternator-starter of a motor vehicle.

In this embodiment, the flange concerned is the front bearing 15 of the housing of the rotary electrical machine, in this case in the form of a motor vehicle alternator.

More specifically, in this embodiment, the device for rectification of alternating current into direct current, the voltage regulator, the brush-holder and the cover are supported by the rear bearing 16, as in FIGS. 1 and 2. The winding 12, the rotor, and the central part of the bearings 15, 16 which support the bearings for fitting of the rotor shaft, are identical to those in FIGS. 1 and 2. For these reasons, FIGS. 3 and 4 show only the elements necessary for understanding of the invention.

The stator 13 is similar to that of the aforementioned document FR 2 918 815. The front bearing 15, the rear bearing 16 and the outer periphery 140 of the body 14 of the stator 13 equipped with the winding 12 are modified in the manner described hereinafter.

Thus, these FIGS. 3 and 4 show the front chignon at 41 and the rear chignon at 42 of the winding 12 supported by the metal body 14 of the stator 13 in the form of a set of plates. The winding 12, which in this case has two continuous wires, is of the polyphase type, and has a plurality of pairs of lateral branches which are each designed to be fitted in a notch in the body 14. The notches can be of the semi-open type with notch wedges as shown in FIG. 4 of the aforementioned document FR 2 918 815. The branches of the same pair can be spaced circumferentially by a polar step. The front chignon 41 has a plurality of connection heads which connect to one another the first ends of each pair of lateral branches, whereas the rear chignon 42 has a plurality of connection feet which connect to one another the second ends of each pair of lateral branches. For this purpose, the connection feet are offset circumferentially relative to the connection heads. For further details on the configuration of the winding 12, reference will be made to application FR 2 918 815. It will be remembered that in this type of embodiment, the air passes through the chignons 41, 42 in a manner which is satisfactory for good cooling of the stator 13, and in particular the stator winding 12, and that a good compromise is found between the axial length or height of the chignon 41, 42 and the permeability of the chignon 41, 42. These chignons 41, 42 have a reduced height, which makes it possible to reduce the axial length of the winding 12, and thus its axial resistance. It is also possible to vary the axial length of the stator 13 body 14. It will be remembered that in conventional motor vehicle alternators, the outer diameter of the stator body 14 varies between 110 and 150 mm. The outer diameter of the rotor varies between 78 mm and 112 mm. The length of the stator body 14 varies between 26 mm and 42 mm. This variation of the length of the body 14 makes it possible to vary the power of the machine. The length of the body 14 depends on that of the length of the excitation winding of the rotor with claws in FIGS. 1 and 2. For low-power alternators, the length of the body 14 is less than that of the excitation winding of the rotor, the ratio of the lengths being equal to or greater than 0.8. For alternators with higher power, the length of the body is greater than that of the excitation winding of the rotor. The winding 12 can have chignons 41, 42 with a length which is different or equal. The connection heads and feet can have a globally pointed form, as can be seen in FIG. 3, and can have an axial length of between 15 and 20 mm. Thus, the stator is equipped with a winding 12 which passes through the stator body 14 by means of the notches in the body, and has on both sides of the stator body 14 chignons 41, 42 with a pointed form, which in particular are triangular, and have a length of between 15 and 20 mm. For further details reference will be made to document FR 2 918 815. The length of the body 14 can vary between 30 and 42 mm. The rotor 4 can comprise 12 poles (6 poles per magnet wheel) and the stator body 14 has 72 notches to support six turns. As a variant, the rotor 4 can comprise 12 poles (6 poles per magnet wheel) and the body of the stator can have 60 notches in order to support five turns. Thus, FIG. 3 shows 5 phase outputs 120 of the polyphase electrical machine, and ligatures 122 for retention of connection wires with the outputs concerned 120 of the chignon 42 which are designed to be connected to the connector of the rectifying bridge. These outputs pass through the base 252 of the rear bearing 16 by means of air output openings 160 of the bearing. In reality, in the embodiment in FIG. 3, the stator body has 72 notches and 6 outputs, some one of them being concealed in FIG. 3.

The ligatures 122 surround the chignon 42 locally, and for this purpose pass through the chignon 42 at its base, i.e. at the level of the rear end of the body 14. The configuration of the feet of the chignon 42 with spaces at the base of the chignon 42 permits the passage of the ligatures 122. These ligatures 122 make it possible to extend the ends of the phase turns in order to create connection wires which pass circumferentially along the free end of the rear chignon 42, in order to place the outputs 120 in the correct location, as can be seen in FIG. 3. In this case, the set of ligatures extends around at least 180°. By means of the ligatures 122, the connection wires are positioned along the entire width of the chignon, thus making it possible to reduce the axial size of the rotary electrical machine, which in this case is in the form of an alternator of a motor vehicle with a thermal engine.

FIG. 3 shows at 151 one of the air intake openings with a globally trapezoidal form provided in the base 152 with globally transverse orientation of the metal front bearing 15 with a hollow form. 150 shows one of air outlet openings with an oblong form which affects the rim 155 with globally axial orientation of this bearing 15, as well as the outer periphery of the base 152.

This rim 155, in the form of a skirt, has projections 156 which each delimit a passage for a tie rod for assembly of the bearings 15, 16. The lugs for securing of the bearing 15 on a fixed part of the vehicle cannot be seen in FIG. 3, because of the representation in perspective of this figure showing the front chignon 41 of the winding 12.

In FIG. 4, 252 indicates the base with transverse orientation of the bearing 16, and 255 shows the rim in the form of a skirt of this bearing 16. The bearings 15, 16 can be made of aluminium. In the above-described manner, the rims 155, 255 are in the form of a skirt.

These FIGS. 3 and 4 show that the outer periphery of the front bearing 15 and the outer periphery 140 of the body 14 are modified.

More specifically, the body 14, which has an annular form, has a cylindrical form on its outer periphery 140. The remainder of the body 14 is unchanged. The bearing 15 is modified at the level of its rim in the form of a skirt 155 which is longer than that in FIG. 1. The remainder of the bearing 15 is unchanged.

On its interior, the skirt 155 has a cylindrical inner support surface 250 for receipt of the stator body 14. This support surface 250 receives one of the axial ends of the body 14, in this case the front axial end, and has a long length. More specifically, in its interior, material is removed at the level of the free end of the skirt 155 for formation of the cylindrical support surface 250. This removal of material leads to a change of inner diameter of the skirt 155 with formation of a shoulder 251 with transverse orientation. In this embodiment, the inner periphery of the skirt 155 thus has a cylindrical support surface 250 with a larger diameter than another support surface 252 with globally axial orientation. The support surfaces 250, 252 are separated from one another by the shoulder 251. The cylindrical support surface 250 belongs to the free end of the skirt 155 whereas the support surface 252 is closer to the base 152. The support surface 252 is inclined axially. It widens in the direction of the free end of the skirt 155 and of the rear bearing 16.

According to one characteristic, the support surface 250 is a cylindrical inner support surface for receipt of the cylindrical outer periphery 140 of the core 14, and the shoulder 251 constitutes an axial stop for the front axial end of the core 14 inserted in the skirt 155. The support surface 250 is a support surface which is wound by induction for fitting by winding of the outer periphery 140 of the core 14, in the manner described hereinafter.

The bearing 16 is in the image of the bearing 15, and thus has on the inner periphery of its skirt 255 a cylindrical inner support surface 260 for receipt of the other axial end of the core 14, in this case the rear end, which is separated from a support surface 262, which has a smaller inclined diameter and widens in the direction of the bearing 15, by a shoulder with transverse orientation 261 forming an axial stop for the rear end of the stator body 14. The support surface 260 is an inner cylindrical support surface for receipt of the outer periphery 140 of the rear end of the core 14, and the shoulder 261 constitutes an axial stop for the rear axial end of the core 14 inserted in the skirt 255.

This support surface 260 is axially shorter than the support surface 250, and constitutes a second inner cylindrical support surface for guiding of the core 14. As can be seen in FIG. 4, the support surface 260 is extended in the direction of the front bearing by a support surface 263 which constitutes the free end of the rear bearing 16. This support surface 263 widens in the direction of the front bearing 15. It is inclined axially. The diameter of this support surface 263 is larger than that of the support surface 260, and is not in contact with the outer periphery 140 of the stator 13 body 14, with a shoulder (with no reference) separating the support surfaces 260, 263 from one another. The support surface 263 permits axial fitting of the free end of the bearing 16 on the core 14 fitted in advance in the skirt 155 of the bearing 15. The support surface 260 is a support surface for guiding of the rear end of the body 14. The core can be fitted with fitting play in the support surface 260.

In this embodiment, the support surface 250 is longer axially than the sum of the axial lengths of the support surfaces 260, 263.

In a variant, at least one of the support surfaces 262, 263, 252 can have a cylindrical form.

In this embodiment, the outer peripheries of the skirts 155, 255 have a frusto-conical form, and face towards one another. As a variant, the outer peripheries of the skirts 155, 255 can have a cylindrical form.

The skirt 255 (FIG. 4) is shorter axially than the skirt 155. As in FIG. 1, axial play exists between the free ends opposite one another of the skirts 155, 255.

The rear bearing 16 is fitted onto the body 14 which is fitted in advance in the front bearing 15. The axial movement of the rear bearing 16 relative to the body 14 is limited by the shoulder 261, whereas the axial movement of the front bearing 15 relative to the body 14 is limited by the shoulder 251.

The metal body 14 is fitted in the cylindrical inner end support surface 250 of the metal front bearing 15 which acts as a heat dissipater. As is known, the bearing 15 is colder than the core 14 when the alternator outputs current via its stator 13. The bearing 15 can thus discharge well by thermal conduction the heat from the core 14 which is heated by the winding 12. This front bearing 15 is also colder than the rear bearing 16, which bears the device for rectification of alternating current into direct current, the voltage regulator, and the brush-holder, such that it is hotter.

According to one characteristic the body 14 is fitted in the support surface 250 by winding with local heating by induction of the front skirt 155 before fitting of the body 14. More specifically, the skirt 155 of the front bearing 15 is configured to carry out winding for the body 14 by means of the cylindrical inner support surface 250.

According to one characteristic, the front bearing 15 is heated locally by heating its skirt 155, which expands, such that the diameter of the support surface 250 increases, thus allowing the body 14 and the stator 13 to be fitted in the support surface 250 of the front bearing 15.

Advantageously, this local heating is carried out at the level of the inner support surface 250.

After this, the front bearing 15 contracts at the level of the skirt 155. The bearing 15, which for example is made of aluminium, acts as a heat dissipater after winding.

According to one characteristic, in one embodiment, the skirt 155 of the front bearing 15 is heated by means of induction.

This type of heating has numerous advantages, i.e. speed, energy efficiency, reproducibility, compactness, localised heating without contact with the source of energy, safety of the operators, energy saving, and ease of integration in the production lines. This type of heating is based on electromagnetic induction.

More specifically, according to one characteristic, in this embodiment, the skirt 155 is heated locally by means of induction in order in particular not to damage the receptacle of the ball bearing in FIG. 1.

More specifically, the outer periphery of the skirt 155 is heated locally by induction in the manner described hereinafter.

According to one embodiment, the heating is carried out by a solenoid which has at least one turn, and preferably at least two turns, and surrounds the skirt 155 in particular at the level of the support surface 250, without contact, such that the skirt is immersed in an electromagnetic field. The energy is thus dissipated in the interior of the skirt, in particular at the level of the support surface 250, in the form of heat. The number of turns of the solenoid depends on the length of the support surface 250 of the skirt 155.

Thus, the diameter of the support surface 250 can be initially slighter (smaller) than the outer diameter of the core 14.

After heating, the front bearing contracts, such that clamping of the support surface 250 on the outer periphery 140 of the body 14 takes place. The bearing 15, which for example is made of aluminium, acts as a heat dissipater after winding. The heat is discharged mainly by conduction because of the clamping of the support surface 250 on the outer periphery 140 of the body 14.

According to another embodiment, slight residual play can exist between the outer periphery 140 of the body 14 and the support surface 250. More specifically, the heating by induction of the skirt 155 makes it possible to fit the bearing 15 easily on the body 14 without risk of wedging, when the support surface 250 has a long length. The heat is discharged partly by conduction, because of the contact of the axial end concerned of the body 14 with the shoulder 251, and by convection, because of the slight play between the support surface 250 and the outer periphery 140 of the body 14.

Thus, in all cases, according to one characteristic, the axial length X of the support surface 250 can be more than half the axial length L1 of the body 14.

The axial length of the support surface 250 can be ⅔ that of the axial length L1 of the body 14.

The axial length of the support surface 250 can be between half and ⅔ that of the length L1 of the body 14 of the stator.

Thus, for a body 14 with a length of between 26 and 42 mm, the minimum length of the support surface 250 will be 13 mm for a body with a length of 26 mm, and 21 mm for a body 14 with a length of 42 mm.

The maximum length of the support surface 250 will be 17.3 mm for a body with a length of 26 mm, and 28 mm for a body 14 with a length of 42 mm.

Figure 5:
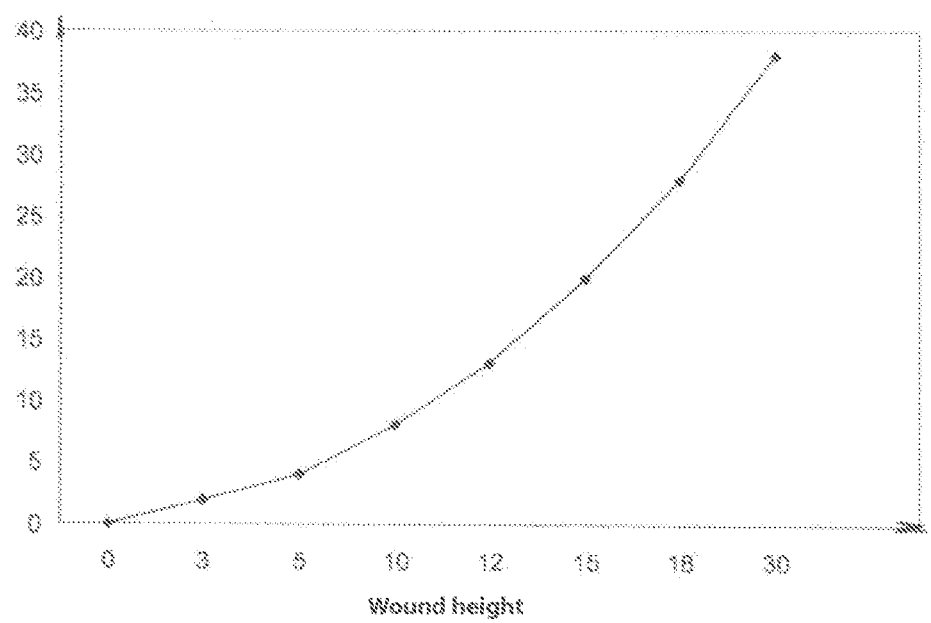
FIG. 5 is a diagram showing the thermal gain in ° C. (degree Celsius) of the stator of the rotary electrical machine, according to the wound axial length of the stator body, for a given clamping between the outer periphery of the stator body and an inner support surface of the skirt of the front bearing.
Figure 6:
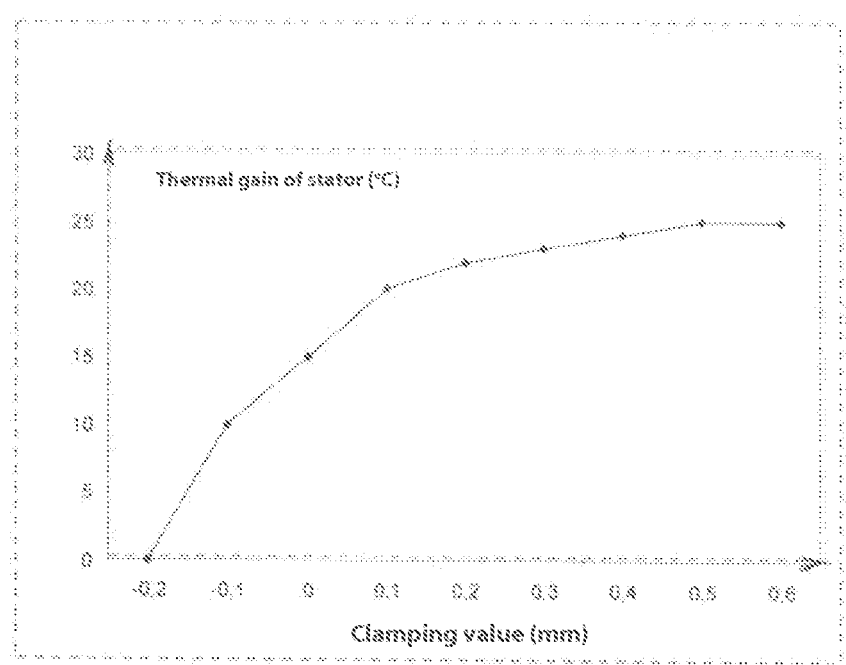
FIG. 6 is a diagram showing the thermal gain in ° C. of the stator of the rotary electrical machine according to the value of the clamping between the outer periphery of the stator body and an inner support surface of the skirt of the front bearing, for a given value of the wound axial length of the stator body.

For a body 14 with a length of 30 mm, as in FIGS. 5 and 6, the minimum length of the support surface 250 will be 15 mm, and the maximum length of the support surface 250 will be 20 mm.

In practice, an input chamfer is provided at the level of the free end of the support surface 250, as shown in broken lines in FIG. 4.

In this example, the axial distance between the shoulder 251 and the free end of the skirt 155 is 20 mm, the axial length of the support surface 250 being 18.5 mm, and that of the chamfer 1.5 mm.

Play of 2 mm exists between the free ends of the skirts 155, 255 of the bearings 15, 16.

The axial length of the sum of the support surfaces 260 and 263 is therefore equal to 8 mm.

According to one characteristic, the axial length of the support surface 260 is at least equal to 10% of the axial length L1 of the body 14.

Thus, for a 30 mm body 14, the minimum axial length of the support surface 260 is 3 mm.

In all cases, the contact of the metal bearing 15 with the metal body 14 preferably takes place at the hottest area of the set of plates 14, which is located in the middle of the length of the set of plates, i.e. on the area which is the most saturated from the magnetic point of view, and is not cooled on a rotary electrical machine, the front and rear bearings of which are assembled in a conventional manner without winding.

As can be seen in FIG. 5, for a given clamping between the stator 13 and the bearing 15, and more specifically between the support surface 250 and the outer periphery 140 of the body 14, the temperature of the stator decreases according to the length X of the support surface 250 corresponding to the wound axial length of the body 14.

For a body 14 with a length of 30 mm and a length X of 15 mm or more, the thermal gain of the stator/decrease in the temperature of the stator is equal to at least 20° C.

As can be seen in FIG. 6, the thermal gain at the level of the stator according to the clamping value between the support surface 250 and the outer periphery 140 of the body 14, increases, for a given length X of winding, according to the clamping between the support surface 250 and the outer periphery 140 of the body 14. It is apparent from this figure that with residual play of 0.1 mm between the support surface 250 and the outer periphery 140 of the body 14, the thermal gain is globally 10°. This gain increases and is globally 15° for zero clamping. The greater the clamping between the support surface 250 and the outer periphery 140 of the skirt 155, the greater the thermal gain. The maximum thermal gain is obtained for clamping of 0.5 mm.

It will be appreciated that the present invention is not limited to the embodiments described.

Thus, the ligatures 122 can be replaced by a binding of the type described in document GB 1 300 215 to which reference will be made. It will be appreciated that this binding will extend over less than 360°, according to the angular position of the outputs 120.

According to one embodiment, the excitation winding 5 can be fixed, the alternator being without brushes and without a collector ring as described for example in document U.S. Pat. No. 2,928,963, to which reference will be made.

In the light of this document U.S. Pat. No. 2,928,963, it is apparent that, as a variant, the outputs 120 of the phases can be implanted in the front bearing, and connected to terminals which pass through the front bearing, in order to be connected by cables to a module which contains the current rectification device.

The ends of the excitation winding can be implanted in the rear bearing. The front bearing can be provided with an air outlet.

As a variant, it will be appreciated that, taking into account this document U.S. Pat. No. 2,928,963, the current rectification device 11 can be supported by the front bearing. The same applies for the voltage regulator.

It will be appreciated that it is apparent from this document U.S. Pat. No. 2,928,963 and application FR 2 820 896 that the winding 12 can comprise electrically conductive elements, for example in the form of a "U" with corkscrewed ends, for connection for example by welding of the conductive elements. Thus, two conductive elements per notch can be provided, or at least four electrically conductive elements per notch as described in document FR 2 820 896 to which reference will be made. This also made possible since this type of winding with conductive elements can have chignons which are as short and permeable as those of the winding 15 in FIGS. 1 to 4.

As a variant, the rotor of the rotary electrical machine can comprise two magnet wheels with claws and two excitation windings as described in document FR 2 857 517.

Again as a variant, the rotor with claws is also provided with a plurality of pairs of permanent magnets implanted between the teeth of the magnet wheels, as shown at 38 in FIG. 2, and the number of pairs of magnets can be equal to, or less than, the number of poles of the rotor with claws.

As a variant, the rotor of the rotary electrical machine can consist of a rotor with projecting poles.

This rotor with projecting poles can comprise a plurality of excitation windings, each wound around a pole of this type and fitted in series as shown in FIGS. 1 and 2 of document WO 02/054566.

In the light of this document, it can be seen that as a variant, this rotor with projecting poles can also comprises permanent magnets.

Also as a variant, the bearing equipped with the voltage regulating device can be cooled by air, whereas the other bearing is cooled by water.

As a variant, the rotary electrical machine, which is a motor vehicle alternator in the aforementioned figures, can be equipped with a current rectification device 11 which is also configured to form an inverter, and for example comprise transistors of the MOSFET type for formation of a reversible alternator which also functions in electric motor mode in particular in order to start the thermal engine of the vehicle. This type of alternator is known as an alternator-starter. For further details, reference will be made to documents FR 2 745 455 and FR 2 866 477.

The invention claimed is:

1. A fitting of a stator body (14) of a stator (13) of a rotary electrical machine, the rotary electrical machine including:
   a bearing (15) having a skirt (155); and
   the stator (13) mounted within the skirt (155) of the bearing (15) and having a stator body (14) equipped with a winding (12) within the stator body (14);
   the stator body (14) is fitted in an inner support surface (250) for the skirt (155) of the bearing (15) of the rotary electrical machine, wherein the skirt (155) is heated locally by induction before fitting of the stator body (14) equipped with the winding (12) in the skirt (155).

2. The fitting according to claim 1, wherein the heating by induction is carried out by a solenoid which has at least one turn, and surrounds the skirt (155) at the level of the inner support surface (250) and without contact, such that the skirt is immersed in an electromagnetic field.

3. The fitting according to claim 2, wherein the inner support surface (250) of the skirt (155) is heated locally by induction.

4. The fitting according to claim 2, wherein, after heating by induction, the clamping between the inner support surface (250) and the outer periphery of the stator body (14) is equal to or more than −0.1 mm.

5. The fitting according to claim 2, wherein the inner support surface (250) is formed by removing material, with formation of an axial stop shoulder for the stator body (14).

6. The fitting according claim 1, wherein the inner support surface (250) of the skirt (155) is heated locally by induction.

7. The fitting according to claim 6, wherein, after heating by induction, the clamping between the inner support surface (250) and the outer periphery of the stator body (14) is equal to or more than −0.1 mm.

8. The fitting according to claim 6, wherein the inner support surface (250) is formed by removing material, with formation of an axial stop shoulder for the stator body (14).

9. The fitting according to claim 1, wherein, after heating by induction, the clamping between the inner support surface (250) and the outer periphery of the stator body (14) is equal to or more than −0.1 mm.

10. The fitting according to claim 9, wherein the inner support surface (250) is formed by removing material, with formation of an axial stop shoulder for the stator body (14).

11. The fitting according to claim 1, wherein the inner support surface (250) is formed by removing material, with formation of an axial stop shoulder for the stator body (14).

12. The fitting according to claim 1, wherein the inner support surface (250) is formed at the level of a free end of the skirt (155).

13. The fitting according to claim 1, wherein an axial length (X) of the inner support surface (250) is more than half an axial length (L1) of the stator body (14).

14. A rotary electrical machine comprising a bearing (15) for receiving of a stator body (14) of a stator (13) with the fitting of the stator body according to claim 1.

15. The machine according to claim 14, wherein the bearing (15) for fitting of the stator body (14) is associated with another bearing (16) with a skirt (255) provided with a second inner support surface (260) for guiding of the stator body (14) with the presence of axial play between opposite free ends of the two opposite bearings (15, 16).

16. The machine according to claim 15, wherein an axial length of the second inner support surface (260) is equal to at least 10% of an axial length (L1) of the stator body (14).

17. The machine according to claim 14, wherein an axial length (L1) of the stator body (14) is between 26 and 42 mm.

18. The machine according to claim 14, wherein the stator body is equipped with a winding (12) which on both sides of the stator body has chignons with a pointed shape and a length of between 15 and 20 mm.

* * * * *